United States Patent
Hall et al.

(10) Patent No.: US 10,293,488 B2
(45) Date of Patent: May 21, 2019

(54) CONTAINER AND ROBOT COMMUNICATION IN INVENTORY SYSTEM

(71) Applicants: David R. Hall, Provo, UT (US); Andrew Priddis, Mapleton, UT (US); Joseph Blanch, Provo, UT (US)

(72) Inventors: David R. Hall, Provo, UT (US); Andrew Priddis, Mapleton, UT (US); Joseph Blanch, Provo, UT (US)

(73) Assignee: Hall Labs LLC, Provo, UT (US)

( * ) Notice: Subject to any disclaimer, the term of this patent is extended or adjusted under 35 U.S.C. 154(b) by 187 days.

(21) Appl. No.: 15/362,195

(22) Filed: Nov. 28, 2016

(65) Prior Publication Data
US 2018/0150661 A1     May 31, 2018

(51) Int. Cl.
*B25J 11/00* (2006.01)
*G06Q 10/08* (2012.01)

(52) U.S. Cl.
CPC .......... *B25J 11/008* (2013.01); *G06Q 10/087* (2013.01)

(58) Field of Classification Search
CPC ... B25J 11/008; G06Q 10/087; G05B 2219/00
See application file for complete search history.

(56) References Cited

U.S. PATENT DOCUMENTS

| | | | | |
|---|---|---|---|---|
| 5,791,512 A * | 8/1998 | Kanatsuka | ............... | G07F 11/62 221/130 |
| 6,694,217 B2 * | 2/2004 | Bloom | ............... | G06Q 20/00 700/215 |
| 8,342,400 B1 * | 1/2013 | Reese | ............... | G06F 19/3462 235/385 |
| 9,367,770 B2 * | 6/2016 | Footen | ............... | G06K 9/78 |
| 9,957,107 B2 * | 5/2018 | Peng | ............... | B65G 1/0457 |
| 10,207,868 B1 * | 2/2019 | Stubbs | ............... | B65G 1/137 |
| 2007/0050271 A1 * | 3/2007 | Ufford | ............... | G06Q 10/087 705/28 |
| 2007/0295580 A1 * | 12/2007 | Solomon | ............... | A47B 63/067 198/468.6 |

(Continued)

OTHER PUBLICATIONS

Richard Bloss, "Automation meets logistics at the Promat Show and demonstrates faster packing and order filling", 2011, Assembly Automation, vol. 31 Issue: 4, pp. 315-318. (Year: 2011).*

(Continued)

*Primary Examiner* — Florian M Zeender
*Assistant Examiner* — Vanessa Deligi (57) ABSTRACT

The invention is a system in which containers communicate their specifications to a robot, preferably a robotic arm, in order to teach the robot how to handle the individual contents of the containers. Each container has a controller that stores information about that container's contents. In order for the robot to interact with the container's contents, the robot communicates with the controller of the container to receive instructions for interacting with the contents. Preferably, the system is part of an automated storage and retrieval system, and the robot interacts with the contents of the containers as part of an assigned task, such as food preparation. The system may include feedback sensors and a user interface.

20 Claims, 8 Drawing Sheets

(56) References Cited

U.S. PATENT DOCUMENTS

| | | | | |
|---|---|---|---|---|
| 2008/0003083 | A1* | 1/2008 | Solomon | B65G 1/127 414/237 |
| 2009/0139999 | A1* | 6/2009 | Blust | G06Q 10/087 221/1 |
| 2009/0180843 | A1* | 7/2009 | Jackson | B66F 7/00 414/12 |
| 2010/0025422 | A1* | 2/2010 | Bjornvall | G07F 9/105 221/150 HC |
| 2010/0310344 | A1* | 12/2010 | Hinnen | G06Q 10/087 414/273 |
| 2011/0101837 | A1* | 5/2011 | Solomon | A47B 63/067 312/319.1 |
| 2013/0223673 | A1* | 8/2013 | Davis | G06K 9/78 382/100 |
| 2013/0302129 | A1* | 11/2013 | Smith | B25J 15/0066 414/800 |
| 2015/0260566 | A1* | 9/2015 | Conder | G01G 19/4144 177/25.13 |
| 2015/0290795 | A1* | 10/2015 | Oleynik | G05B 19/42 700/257 |
| 2016/0169576 | A1* | 6/2016 | Takaki | F25D 29/00 700/275 |
| 2016/0206132 | A1* | 7/2016 | Chen | A47J 36/32 |
| 2016/0236865 | A1* | 8/2016 | Altemir | B65G 1/0407 |
| 2016/0260352 | A1* | 9/2016 | Ortiz | G09B 19/0092 |
| 2016/0349728 | A1* | 12/2016 | Oehring | G05B 19/0428 |
| 2017/0150843 | A1* | 6/2017 | Rosalia | A47J 43/044 |
| 2017/0348854 | A1* | 12/2017 | Oleynik | B25J 9/1605 |
| 2018/0057264 | A1* | 3/2018 | Wicks | B65G 1/1373 |
| 2018/0060805 | A1* | 3/2018 | Edwards | G06K 7/10366 |
| 2018/0089474 | A1* | 3/2018 | Ramon | G06K 7/10316 |
| 2018/0114184 | A1* | 4/2018 | Brooks | G01G 23/18 |
| 2018/0148259 | A1* | 5/2018 | Gravelle | B65G 1/02 |
| 2018/0169858 | A1* | 6/2018 | Jain | B25J 9/163 |
| 2018/0189720 | A1* | 7/2018 | Henderson | G06Q 10/087 |

OTHER PUBLICATIONS

Stander, M., "A Smart Kitchen Infrastructure", Dec. 1, 2012, 2012 IEEE International Symposium on Multimedia, pp. 96-99. (Year: 2012).*

Sturm J., "Operating articulated objects based on experience", Oct. 1, 2010, 2010 IEEE/RSJ International Conference on Intelligent Robots and Systems, pp. 2739-2744. (Year: 2010).*

* cited by examiner

CONTAINER AND ROBOT COMMUNICATION IN INVENTORY SYSTEM

CROSS-REFERENCES

Technical Field

This invention relates generally to the field of robotics, and more specifically to automated inventory handling.

BACKGROUND

Whether in a large business or in a home environment, keeping up an inventory can take a lot of work. However, incorporating technology into inventory systems has helped reduce the amount of work required. For example, containers holding inventory items have been mechanized to transport the items where they are needed. Inventory items have been equipped with unique identifiers such as bar codes or radio frequency identification tags (RFID tags) to allow an inventory system to track the movement of the inventory items. Robotic mechanisms with end effectors have been used to handle and manipulate inventory items. All of these innovations have improved inventory systems, but there is still potential for improvement, especially when it comes to using robotic mechanisms in inventory systems.

One challenge with using robotic mechanisms with end effectors to handle and manipulate items is supplying the robotic mechanisms with the functional instructions needed for interacting with each item. In some current systems, the robotic mechanisms are preprogrammed to handle each item with which they will foreseeably interact. In other current systems, the robotic mechanisms are programmed by installing software programs via physical memory devices that accompany the items. In still other current systems, information about each inventory item is stored in a centralized database that is accessible by the robotic mechanism and a user interface. Users oversee and maintain the inventory system via the user interface and update the database when new items with new properties are added to the inventory. The robotic mechanisms access the inventory for information to instruct them how to interact with the inventory items. In some systems, the robotic mechanisms scan bar codes or RFID tags to identify items in the database.

However, all of these systems provide challenges when there are many or changing items of all shapes and sizes. Programming the robotic mechanisms or updating the database is complex and time-consuming. Furthermore, the robotic mechanisms and items often must be manufactured and sold together in order to be compatible and for the robotic mechanisms to have access to any databases containing the item information.

In light of the foregoing, what is needed is an inventory system in which each component of the system stores only the necessary information required to perform tasks specific to that component, and in which each component is capable of communication with all other components with which it interacts in order to access any additional information. In other words, what is needed is an inventory system in which each inventory item can communicate its own specifications to a robotic mechanism in order to teach the robot how to interact with the item.

SUMMARY OF THE INVENTION

The disclosed invention has been developed in response to the present state of the art and, in particular, in response to the problems and needs in the art that have not yet been fully solved by currently available components and methods. Accordingly, efficient structural components and methods have been developed to allow an inventory handling system that improves upon the prior art.

Consistent with the foregoing, a system is disclosed. The system comprises one or more containers. Each container comprises a controller comprising information about individual contents of the container. The system further comprises a robot that communicates with the controller of each container to receive instructions how to interact with the individual contents of the container.

In a preferred embodiment, the robot is a robotic arm, and the information comprises physical properties and handling instructions of the individual contents. In some embodiments, the individual contents comprise machine reader indicia such as RFID tags. The containers may be components, such as storage bins, in an automated storage and retrieval system. Alternatively, the containers may simply be removably mounted to walls. In some embodiments, the robot interacts with items in the one or more containers as part of an assigned task such as food preparation. In some embodiments, the system further comprises a user interface that displays information about the individual contents of the one or more containers and allows a user to assign tasks to the robot. In some embodiments, the containers or the robot further comprise sensors that provide feedback to the system.

BRIEF DESCRIPTION OF THE DRAWINGS

A more particular description of the invention briefly described above is made below by reference to specific embodiments depicted in drawings included with this application, in which.

DETAILED DESCRIPTION

A detailed description of the claimed invention is provided below by example, with reference to embodiments in the appended figures. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed.

Figure 1:
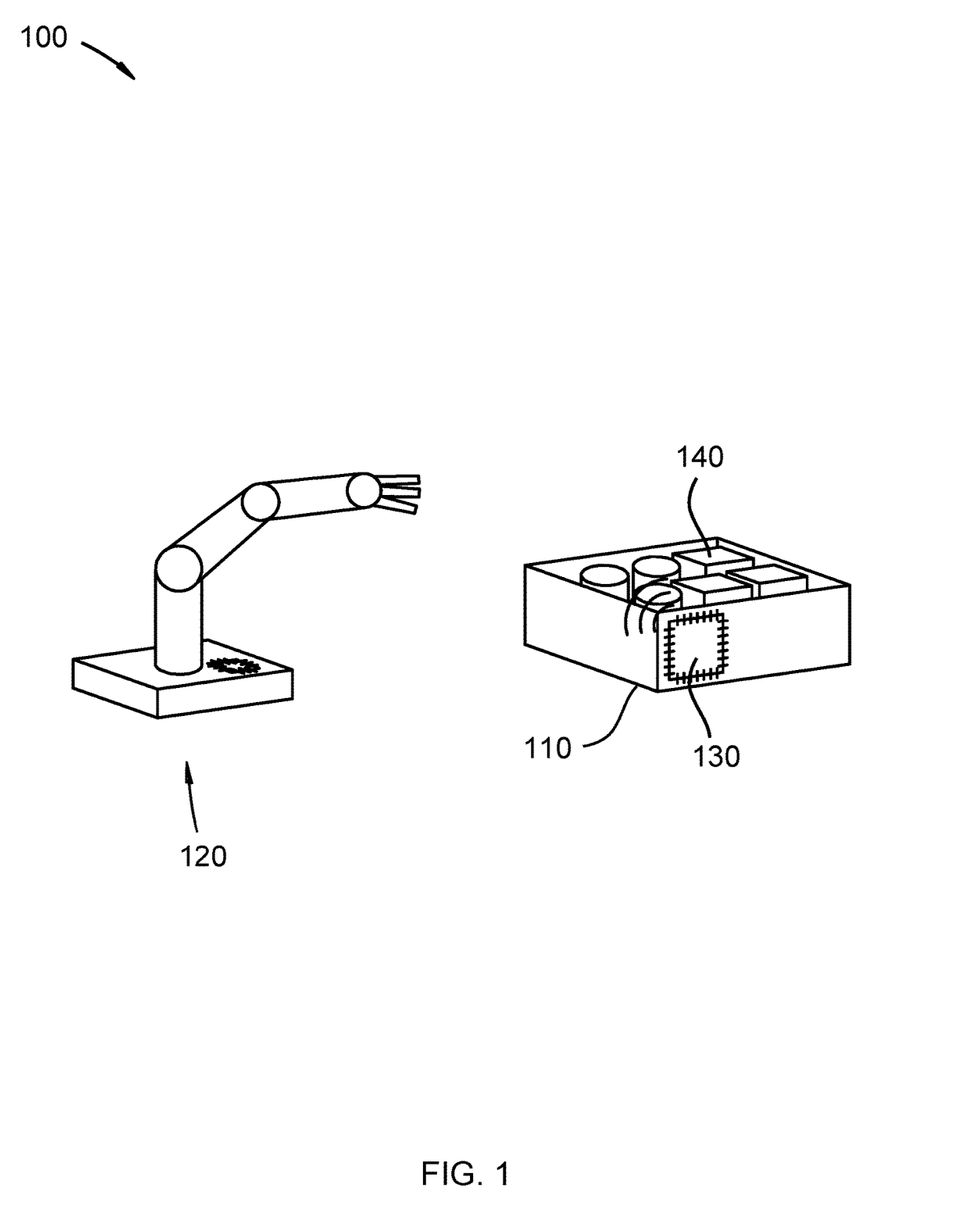
FIG. 1 depicts one embodiment of a system comprising one or more containers and a robot.

FIG. 1 depicts one embodiment of a system 100 comprising one or more containers 110 and a robot 120. Each container 110 comprises a controller 130 comprising information about individual contents 140 of the container 110. The robot 120 communicates with the controller 130 of each container 110 to receive instructions how to interact with the individual contents 140 of the container 110.

Figure 2:
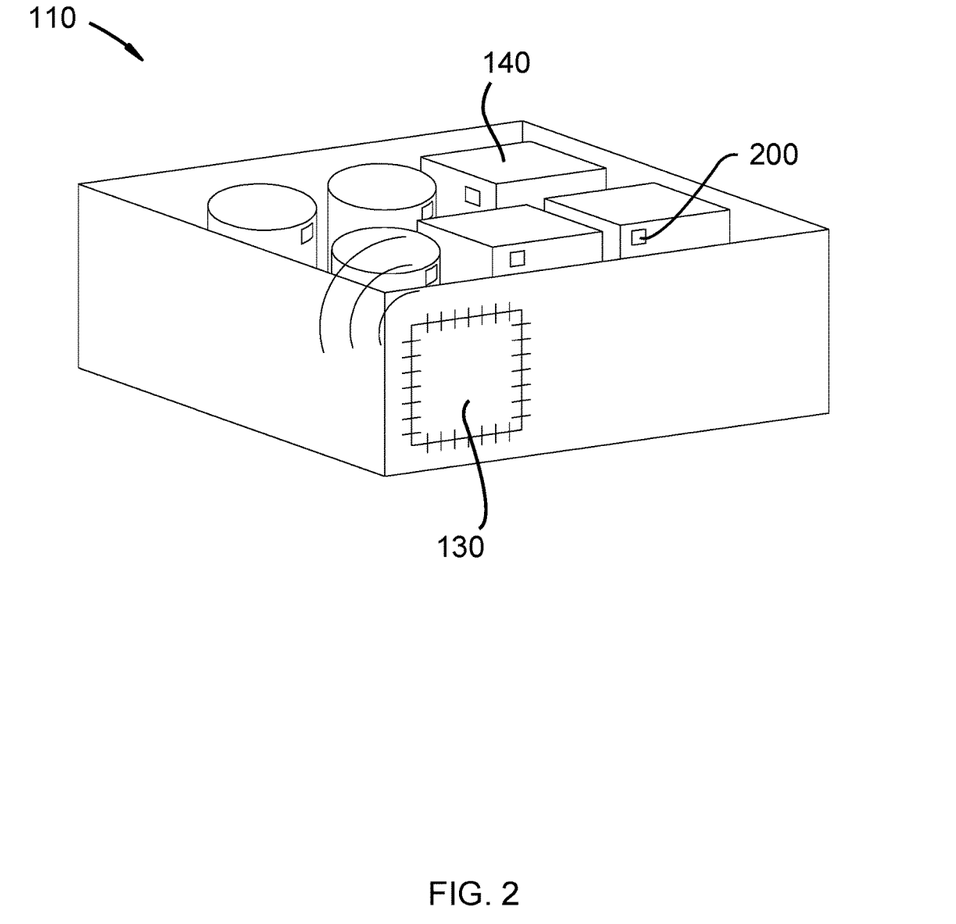
FIG. 2 depicts one embodiment of one of the one or more containers.

FIG. 2 depicts one embodiment of one of the one or more containers 110. Each of the one or more containers 110 comprises a controller 130 comprising information about individual contents 140 of the container 110. In one embodiment, the information about individual contents 140 of the container 110 is stored in a driver file in the memory of the controller 130. In one embodiment, the information comprises physical properties and handling instructions of the individual contents 140. In one embodiment, the information comprises size, shape, weight, position, temperature, texture, and material makeup information for the individual contents 140 of the container 110. The controller 130 of each of the one or more containers 110 communicates with the robot 120. In different embodiments, the controller 130 and the robot 120 may communicate by means of wireless, Bluetooth, serial connections, or other means commonly known by persons of skill in the art. In a preferred embodiment, when the controller 130 and the robot 120 establish a connection, or "shake hands," the robot 120 sends a command to the controller 130 to send the information about individual contents 140 of the container 110 stored in the driver file of the controller's memory to the robot 120. The controller 130 is programmed to recognize the command from the robot 120 and sends the information.

The information is used for a variety of purposes. One purpose is to give instructions to the robot 120 how to interact with the individual contents 140 of the container 110. For example, in one embodiment, a robot 120 is tasked to remove one object among the individual contents 140 from one of the one or more containers 110. The robot 120 communicates directly with the controller 130 of the one or more containers 110 to receive information about the object's position in order to know where to move to grasp the object, information regarding the object's size and shape in order to know how to take hold of the object, and information regarding the object's texture, weight, and material makeup in order to know how firmly to grasp the object. The robot 120 may receive information about the object's handling instructions so that the robot 120 can execute a function performed by the object. In one embodiment, the controller 130 is powered by battery. In a preferred embodiment, the controller 130 is powered by means of electrically conductive wall hooks that suspend and support the one or more containers 110. In one embodiment, the electrically conductive wall hooks are those which are described in patent specification U.S. Ser. No. 15/277,090, Electrically Conductive Wall Hooks, which is commonly owned by the Applicant and incorporated by reference for all that it teaches.

In one embodiment, the individual contents 140 of each container 110 comprise machine reader indicia 200. In some embodiments, the machine reader indicia 200 are radio frequency identification (RFID) tags. In other embodiments, the machine reader indicia 200 are bar codes. The machine reader indicia 200 allow the robot 120, equipped with a machine reader in some embodiments, to quickly identify individual contents 140 of each container 110. This can assist the robot 120 in doublechecking that it is interacting with the appropriate objects as identified and described by the controller 130.

In a preferred embodiment, the one or more containers 110 are storage bins. The storage bins may contain any of a variety of individual contents 140, such as pharmaceutical goods, office supplies, home storage items, warehouse items, etc. In a preferred embodiment, the storage bins contain kitchen items, such as foodstuffs, dishes, utensils, cookware, appliances, linens, and so forth. In other embodiments, the one or more containers 110 may be drawers, shelves, boxes, buckets, tubs, cupboards, cabinets, or any other of the myriad available containers. In a preferred embodiment, the one or more containers 110 comprise dimensions of 20 inches wide, 12 inches tall, and 12 inches deep. In other embodiments, width dimensions range from 6 inches to 30 inches, and height and depth dimensions range from 6 inches to 20 inches. In a preferred embodiment, the one or more containers 110 comprise aluminum or plastic. In other embodiments, the one or more containers 110 comprise foam, glass, other metals, or carbon fiber.

Figure 3:
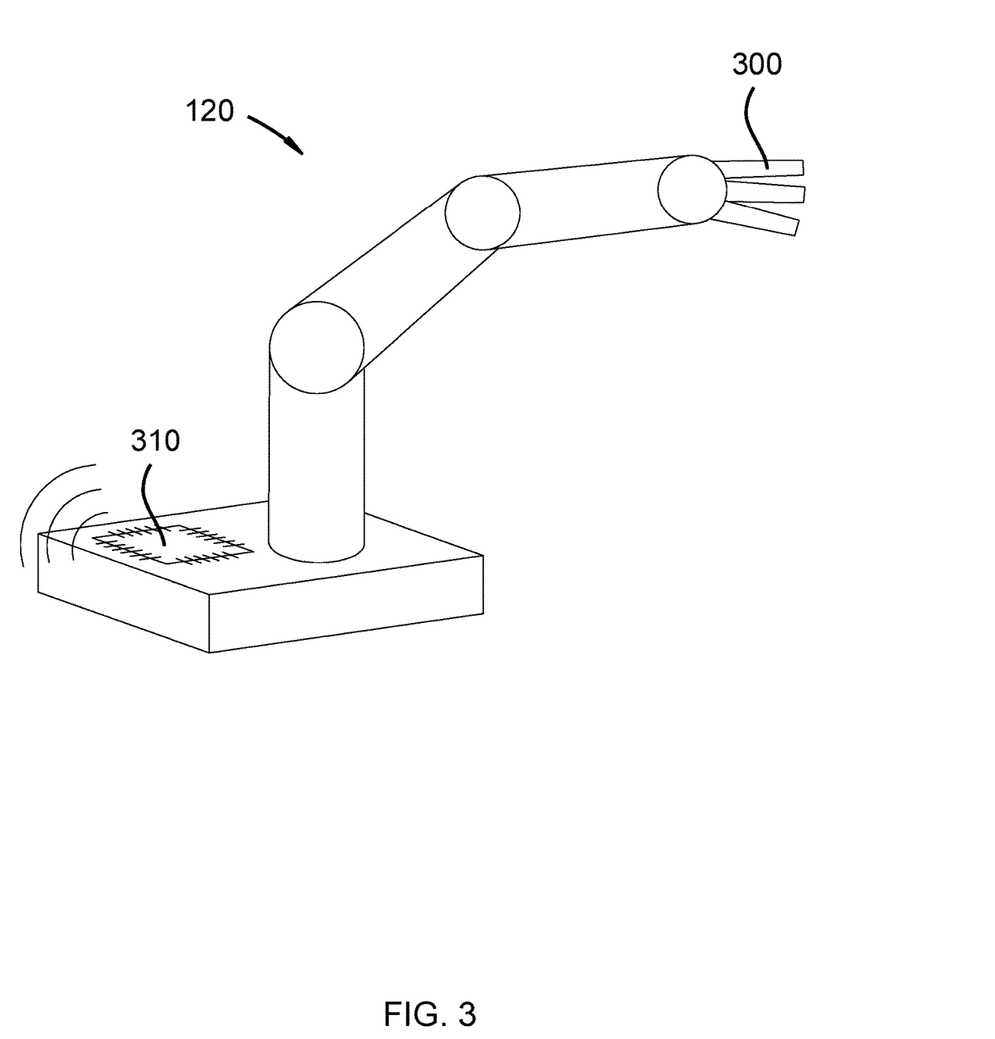
FIG. 3 depicts one embodiment of the robot.

FIG. 3 depicts one embodiment of the robot 120. In a preferred embodiment, the robot 120 is a robotic arm. The robotic arm may be a Cartesian robotic arm or another variety commonly known by those of skill in the art. In other embodiments, the robot 120 is an overhead hoist, a crane, or a drone. In a preferred embodiment, the robot 120 comprises an end effector 300 that interfaces with the individual contents 140 of the one or more containers 110. In a preferred embodiment, the end effector 300 comprises dexterous fingers that grasp items in a manner similar to a grasping human hand. In other embodiments, the end effector 300 comprises hooks, magnets, clamps, ropes, claws, or grippers.

In one embodiment, the robot 120 comprises a controller 310. The robot 120 communicates with the controller 130 of each container 110 by means of the controller 310 to receive instructions how to interact with the individual contents 140 of the container 110. In different embodiments, the controller 130 of each container 110 and the controller 310 of the robot 120 may communicate by means of wireless, Bluetooth, serial connections, or other means commonly known by persons of skill in the art. In a preferred embodiment, when the controller 130 of the container and the controller 310 of the robot 120 establish a connection, or "shake hands," the controller 310 of the robot 120 sends a command to the controller 130 of the container 110 to send the information about individual contents 140 of the container 110 stored in the driver file of the controller's memory. The command is a special code promoted as a standard protocol. The controller 130 is programmed to recognize the command from the robot 120 and sends the information. The controller 310 of the robot 120 receives the information and uses it for instructions how to interact with the individual contents 140 of the one or more containers 110. The controller 310 processes the information and uses it in creating working commands that are sent to actuators within the robot 120 to move the robot 120 in accordance with a request from a user to perform a particular action on the individual contents 140 of the container 130. For example, if a user requests one object within the individual contents 140 of a container 110, the robot 120 uses the information received from the container 110 in forming a command to retrieve the object. The robot 120 interacts with the one or more containers 110 and the individual contents 140 of the one or more containers 110 in this way, adding, removing, and rearranging the individual contents 140 of the one or more containers 110, or executing other functions on the individual contents 140. In one embodiment, a user requests specific actions from the robot 120 via a user interface.

The robot 120 and the one or more containers 110 of system 100 may be arranged in a variety of configurations.

In different embodiments, the one or more containers 110 are stacked, located on shelves, placed in racks, or removably mounted to a ceiling. The one or more containers 110 may be arranged vertically in one or more columns or horizontally in one or more rows. In different embodiments, the robot 120 may be mounted above, alongside, or below the one or more containers 110.

Figure 4:
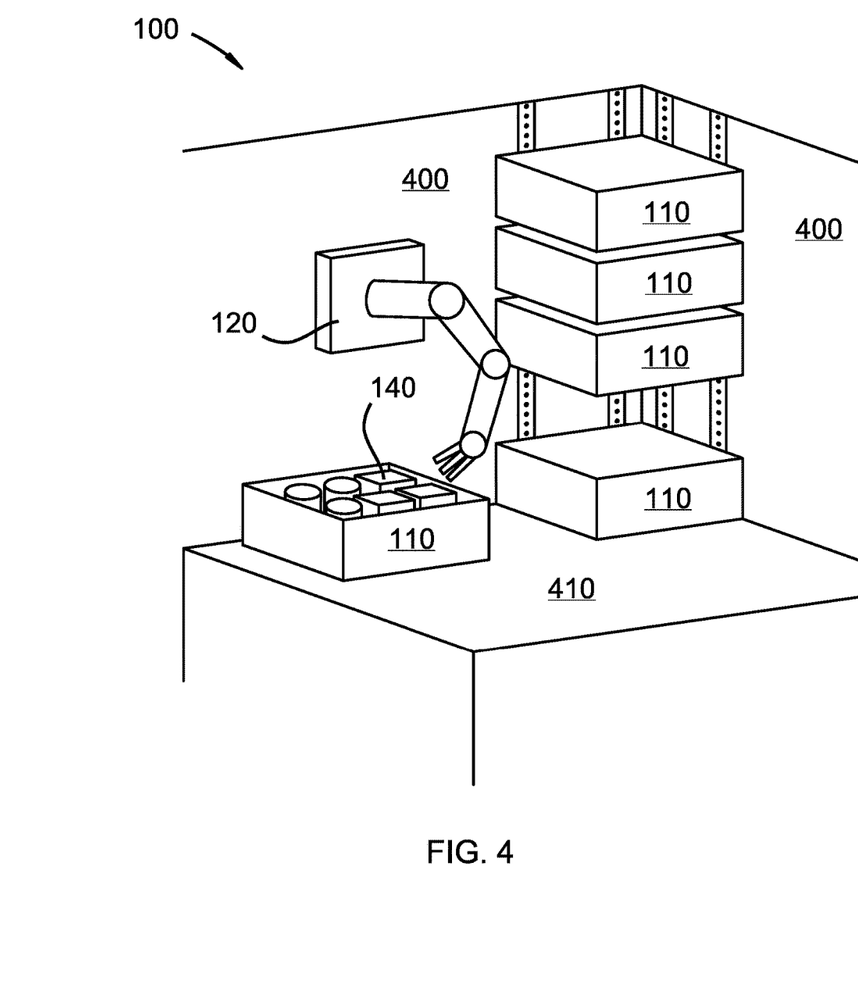
FIG. 4 depicts one embodiment of the system wherein the one or more containers are removably mounted to one or more walls.

FIG. 4 depicts one embodiment of the system 100 wherein the one or more containers 110 are removably mounted to one or more walls 400. In a preferred embodiment, the one or more containers 110 are storage bins. In other embodiments, the one or more containers 110 may be drawers, shelves, boxes, or any other of the myriad available containers. In one embodiment, the robot 120 relocates the one or more containers 110 to gain access to the individual contents 140 of the one or more containers 110. For example, in one embodiment, one or more containers 110 are mounted to one or more walls 400. The robot 120 is instructed to remove an item contained in one of the containers 110. The robot 120 removes a container 110 that contains the item from the one or more walls 400 and places the container 110 on an adjacent surface 410. Then, the robot 120 removes the item from the container 110 and returns the container 110 to the one or more walls 400.

Figure 5:
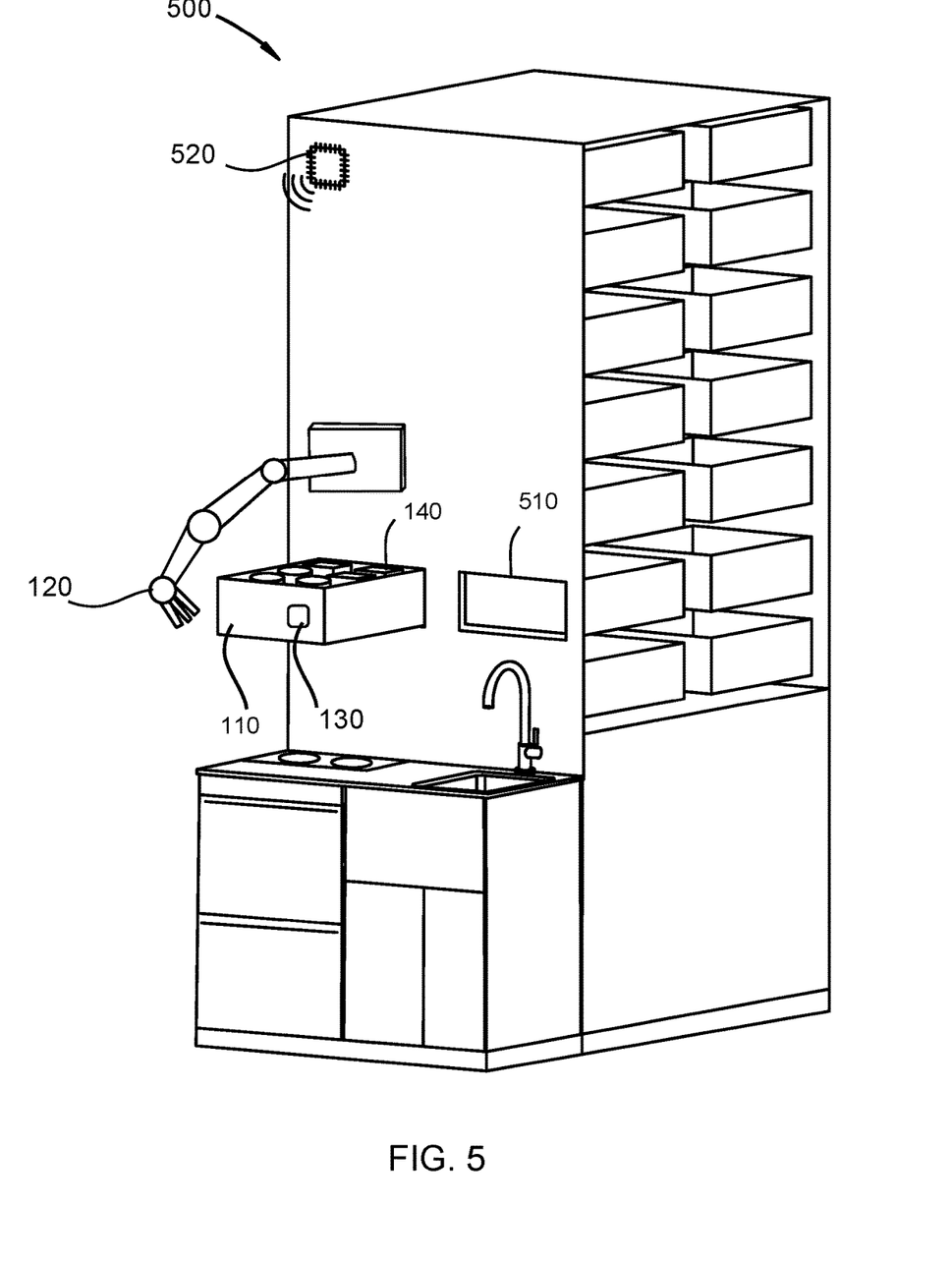
FIG. 5 depicts one embodiment of the system wherein the one or more containers are components of an automated storage and retrieval system.

In some embodiments, the robot 120 and the one or more containers 110 of system 100 are part of a larger system. FIG. 5 depicts one embodiment, in which the one or more containers 110 are components of an automated storage and retrieval system 500. In preferred embodiments, the automated storage and retrieval system 500 is that which is described in Automatic Storage and Retrieval System with Planar Motion Mechanism, patent specification No. U.S. Ser. No. 15/248,589; Automated Storage and Retrieval Direct Movement Method, patent specification No. U.S. Ser. No. 15/260,979; or Automated Storage and Retrieval System with Retractable Mountings, patent specification No. U.S. Ser. No. 15/278,545, which are commonly owned by the Applicant and incorporated by reference for all that they teach. The one or more containers 110 are stored within the automated storage and retrieval system 500, and when one of the one or more containers 110 is requested by a user, the one or more containers 110 are repositioned within the automated storage and retrieval system 500 until the requested container 110 is delivered from its storage location to a convenient position within the automated storage and retrieval system 500. In one embodiment, the automated storage and retrieval system 500 comprises one or more access ports 510, and the automated storage and retrieval system 500 brings the one or more containers 110 to the one or more access ports 510. Each access port 510 comprises a window that provides access to at least one of the one or more containers 110. The robot 120 interacts with the one or more containers 110 and the individual contents 140 of the one or more containers 110 at the one or more access ports 510. In one embodiment, the automated storage and retrieval system 500 comprises a central controller 520 that communicates with the controller 130 of each of the one or more containers 110, and the robot 120 communicates with the central controller 520 of the automated storage and retrieval system 500. The central controller 520 and the controller 310 of the robot 120 may communicate by means of wireless, Bluetooth, serial connections, or other means commonly known by persons of skill in the art. When the central controller 520 and the controller 310 of the robot 120 establish a connection, or "shake hands," the central controller 520 of the robot 120 sends a command to the central controller 520 to send the information about individual contents 140 of the one or more containers 110 stored in a driver file of the memory of the central controller 520. The central controller 520 is programmed to recognize the command from the robot 120 and sends the information. The central controller 520 of the automated storage and retrieval system 500 also updates the location information for the one or more containers 110 each time the one or more containers 110 are repositioned within the automated storage and retrieval system 500. When a user requests an item from the automated storage and retrieval system 500, the automated storage and retrieval system 500 communicates with the controller 130 of each of the one or more containers 110 to locate one of the one or more containers 110 that contains the requested item within the individual contents 140 of the container 110 and brings that container 110 to the robot 120. In one embodiment, the automated storage and retrieval system 500 comprises one or more access ports 510, and the automated storage and retrieval system 500 brings the one or more containers 110 to the one or more access ports 510. The robot 120 then uses the information it received from the central controller 520 about the individual contents 140 of the one or more containers 110 and uses it for instructions how to interact with the individual contents 140 of the one or more containers 110.

Figure 6:
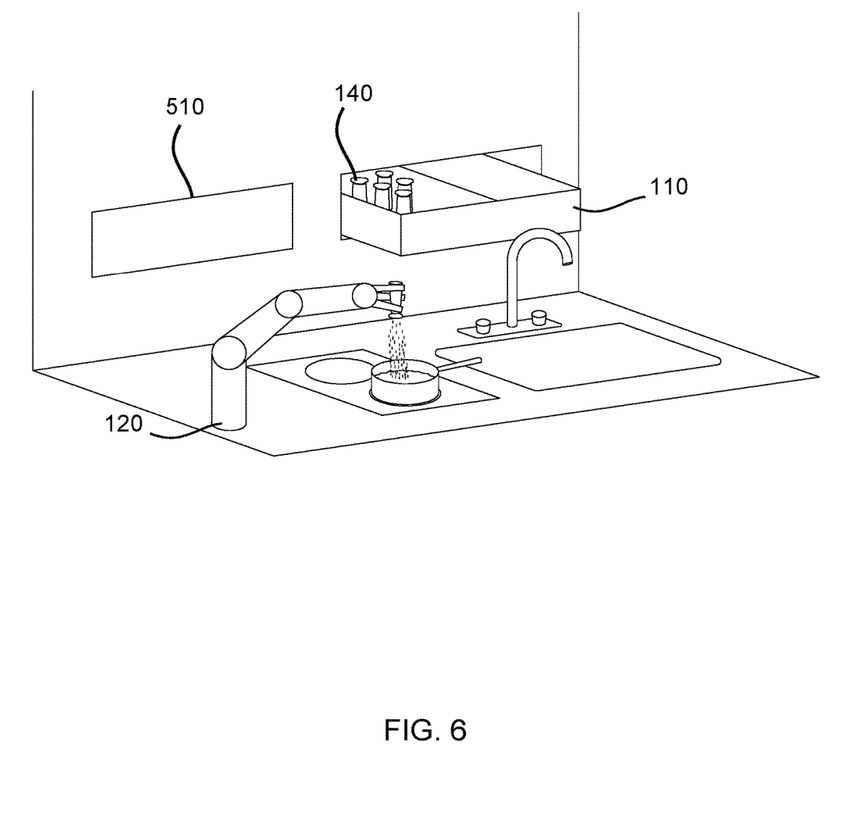
FIG. 6 depicts one embodiment of the robot interacting with the one or more containers as part of an assigned task.

FIG. 6 depicts one embodiment of the robot 120 interacting with the one or more containers 110 as part of an assigned task. In one embodiment, the assigned task is food preparation. In this embodiment, the robot 120 interacts with food items and appliances stored as individual contents 140 of the one or more containers 110 as needed to aid in food preparation. For example, the robot 120 may be assigned the task of cooking pasta. The robot 120 first sends a command to the controller 130 of the one or more containers 110 or the controller 520 of the automated storage and retrieval system 500 to receive information about the individual contents 140 of the one or more containers 110. The robot 120 uses the information received from the controller 130 of the one or more containers 110 or the controller 520 of the automated storage and retrieval system 500 for creating commands to interact with the individual contents 140 of the one or more containers 110 to retrieve and operate the necessary items for cooking pasta. The one or more containers 110 instruct the robot 120 how to obtain and handle each item needed to perform the task. For example, in one embodiment, the robot 120 may remove a pot from the container 110, place the pot under a faucet to fill the pot with water, and place the pot on a burner. The robot 120 may then send a request to an automated storage and retrieval system 500 for a box of pasta. The automated storage and retrieval system 500 brings a container 110 containing a box of pasta to an access port 510. The container 110 has given information to the robot 120 instructing it how to obtain and handle the box of pasta, and the robot 120 removes the box of pasta from the container 110, opens the box, and empties the pasta into the pot. The robot 120 continues to cook the pasta, following a pre-programmed set of cooking instructions. Each time the robot 120 needs an item, the robot 120 sends a request to the automated storage and retrieval system 500, and the automated storage and retrieval system 500 brings a container 110 containing that item to an access port 510. Then, the container 110 instructs the robot 120 how to obtain and handle the needed item.

Figure 7:
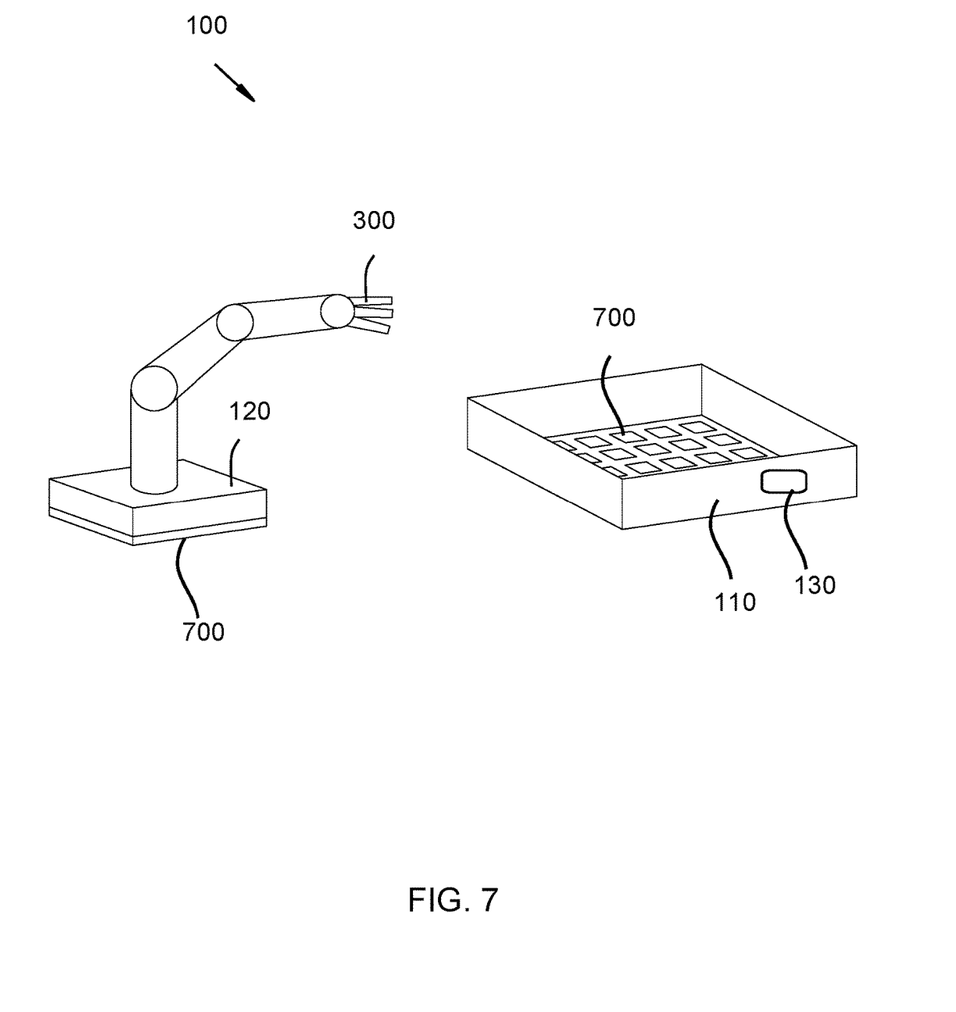
FIG. 7 depicts one embodiment of the system further comprising one or more sensors that provide feedback for the system.

FIG. 7 depicts one embodiment of the system 100 further comprising one or more sensors 700 that provide feedback for the system 100. The one or more sensors 700 comprise at least one of a group consisting of light, sound, proximity, force, weight, and temperature sensors. In a preferred embodiment, the one or more sensors 700 comprise weight sensors. In one embodiment, the weight sensors are in communication with the robot 120. In another embodiment, the weight sensors are in communication with the one or more containers 110. In the embodiment in which the sensors are in communication with the robot 120, the robot 120 uses feedback from the one or more sensors 700 to determine whether or not the robot 120 has an item suspended from the end effector 300. If the robot 120 has an item suspended from the end effector 300, the one or more sensors 700 detect weight over and beyond the weight of the robot 120. In the embodiment in which the sensors are in communication with the one or more containers 110, feedback from the one or more sensors 700 is used to ascertain at least one of the group consisting of whether individual contents 140 have been removed from the one or more containers 110, whether individual contents 140 have been added to the one or more containers 110, and current stock levels of the individual contents 140 of the one or more containers 110. Each container 110 comprises a controller 130 comprising information about individual contents 140 of the container 110. Feedback from the one or more sensors 700 may be compared with information stored in the controller 130. As items are added by the robot 120 to the one or more containers 110, feedback from the one or more sensors 700 confirms an increase in weight and the controller 130 is updated to account for the presence of the items. As items are removed by the robot 120 from the one or more containers 110, feedback from the one or more sensors confirms a decrease in weight and the controller 130 is updated to account for the absence of the removed items. In one embodiment, current stock levels of the individual contents 140 of the one or more containers 110 are monitored by the feedback from the one or more sensors 700. If an item's weight is below a designated amount, the container 110 holding the item indicates to a user that the item is at a low stock level. In another embodiment, the one or more containers 110 track usage of the individual contents 140 of the one or more containers 110. Each time an item is removed from a container 110 by the robot 120, used in an assigned task, and then replaced in the container 110, the difference in weight from when the item was removed to when the item was replaced is recorded and stored in the microcontroller 130. This information is used to track when and by what amount the individual contents 140 of the one or more containers 110 are depleted. In one embodiment, each container 110 comprises one weight sensor that detects changes to the weight of the container 110 as a whole. In another embodiment, each item of the individual contents 140 of the one or more containers 110 has a designated location within a container 110 and each designated location comprises a sensor 700. When the robot 120 returns an item to one of the one or more containers 110, the robot 120 communicates to the container 110 which item the robot 120 is returning. The container 110 then instructs the robot 120 to place the item in a designated location within the container 110 corresponding to the item. The sensor 700 located at the designated location confirms that the item has been placed in the correct location within the container 110.

Figure 8:
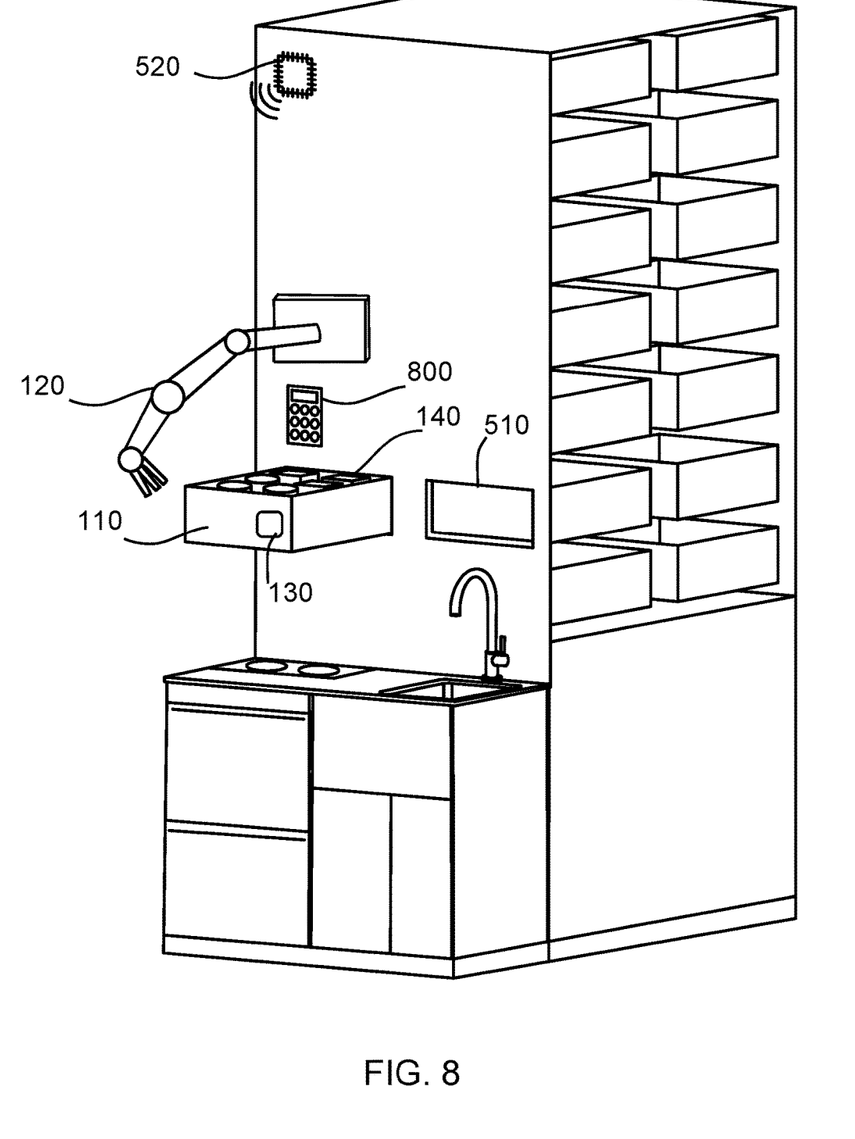
FIG. 8 depicts the system further comprising a user interface.

FIG. 8 depicts the system 100 further comprising a user interface 800. In one embodiment, a user assigns tasks to the robot 120 via the user interface 800. For example, in one embodiment, a user assigns the robot 120, via the user interface 800, a task to cook a meal. In another embodiment, a user assigns the robot 120, via the user interface 800, a task to retrieve a designated container of medicine from the one or more containers 110. In one embodiment, the user interface 800 communicates with the robot 120. The user interface 800 sends the robot 120 a task or an item request. The robot 120 communicates with the one or more containers 110 to retrieve items from the individual contents 140 of the one or more containers 110 in order to perform the task or retrieve the item. In another embodiment, the user interface 800 communicates with the one or more containers 110. The one or more containers 110 communicate to the user interface 800 information about the individual contents 140 of the one or more containers 110. A user is informed of current stock levels of the individual contents 140 within the one or more containers 110 via a display on the user interface 800. In one embodiment, the user interface 800 communicates with the automated storage and retrieval system 500. The automated storage and retrieval system 500 informs the user interface 800 of the number and location of the one or more containers 110, along with information about the individual contents 140 of the one or more containers 110. This information is displayed on the display of the user interface 810. In a preferred embodiment, the user interface 800 comprises a voice control user interface. In other embodiments, the user interface 800 comprises buttons or a touch-sensitive display on a mobile device.

The invention claimed is:
1. A system comprising:
one or more containers;
the one or more containers stored in an automatic storage and retrieval system comprising a planar motion mechanism movable in vertical and horizontal planes attached to a frame, the planar motion mechanism comprising an end effector for removable attachment to the one or more containers;
each container comprising means for removable attachment to the end effector and side walls joined by a bottom wall, the bottom wall comprising one or more separately designated locations for individual contents within the container, the respective designated locations each comprising at least one weight sensor and a controller comprising information about the individual contents of the container at the respective designated locations; and
a robot that communicates with the planar motion mechanism and the controller of each container to receive instructions how to select, retrieve, and reposition the container within the planar motion mechanism and how to interact with the individual contents at the respective designated locations of the container, wherein
the planar motion mechanism makes the container accessible to the robot and the robot removes the individual contents from its designated location and replaces the individual contents to its designated location and returns the container to the planar motion mechanism according to the instructions.

2. The system of claim 1, wherein the robot is a robotic arm.

3. The system of claim 1, wherein the information comprises physical properties and handling instructions of the individual contents.

4. The system of claim 1, wherein the information comprises size, shape, weight, position, temperature, texture, and material makeup information for the individual contents of the container.

5. The system of claim 1, wherein the individual contents of each container comprise machine reader indicia.

6. The system of claim 5, wherein the machine reader indicia are radio frequency identification (RFID) tags.

7. The system of claim 1, wherein the one or more containers are storage bins.

8. The system of claim 1, wherein the one or more containers are removed from the automated storage and retrieval system, and wherein the one or more containers are repositioned within the automated storage and retrieval system after use.

9. The system of claim 8, wherein the automated storage and retrieval system further comprises one or more access ports, and wherein the automated storage and retrieval system brings the one or more containers to the one or more access ports, and wherein the robot interacts with the one or more containers and the individual contents of the one or more containers at the one or more access ports.

10. The system of claim 8, wherein the automated storage and retrieval system comprises a central controller that communicates with the controller of each of the one or more containers, and wherein the robot communicates with the controller of the automated storage and retrieval system.

11. The system of claim 1, wherein the robot interacts with the one or more containers as part of an assigned task.

12. The system of claim 11, wherein the assigned task is food preparation.

13. The system of claim 1, wherein the one or more containers are removably mounted to one or more walls.

14. The system of claim 1, further comprising one or more sensors that provide feedback for the system.

15. The system of claim 14, wherein the one or more sensors comprise weight sensors that are in communication with the robot.

16. The system of claim 14, wherein the one or more sensors comprise weight sensors that are in communication with the one or more containers.

17. The system of claim 16, wherein feedback from the weight sensor is used to ascertain at least one of the group consisting of whether individual contents have been removed from the one or more containers, whether individual contents have been added to the one or more containers, and current stock levels of the individual contents of the one or more containers.

18. The system of claim 1, further comprising a user interface.

19. The system of claim 18, wherein a user is informed of current stock levels of the individual contents within the one or more containers via the user interface.

20. The system of claim 18, wherein a user assigns tasks to the robot via the user interface.

\* \* \* \* \*